United States Patent
Gopishankar et al.

(10) Patent No.: US 12,056,913 B2
(45) Date of Patent: Aug. 6, 2024

(54) SYSTEM FOR LUMINANCE QUALIFIED CHROMATICITY

(71) Applicant: Project Giants, LLC, Beaverton, OR (US)

(72) Inventors: Lakshmanan Gopishankar, Beaverton, OR (US); Arvind Madhav Nayak, Bangalore (IN)

(73) Assignee: PROJECT GIANTS LLC, Beaverton, OR (US)

( * ) Notice: Subject to any disclaimer, the term of this patent is extended or adjusted under 35 U.S.C. 154(b) by 333 days.

(21) Appl. No.: 17/369,839

(22) Filed: Jul. 7, 2021

(65) Prior Publication Data

US 2022/0012521 A1 Jan. 13, 2022

(30) Foreign Application Priority Data

Jul. 9, 2020 (IN) .............................. 202011029187
Jul. 11, 2020 (IN) .............................. 202011029535

(51) Int. Cl.
*G06T 7/90* (2017.01)
*G06T 11/00* (2006.01)
(Continued)

(52) U.S. Cl.
CPC ................ *G06V 10/56* (2022.01); *G06T 7/90* (2017.01); *G06T 11/001* (2013.01); *G06V 10/60* (2022.01); *G06T 2207/10024* (2013.01)

(58) Field of Classification Search
CPC .......... G06V 10/56; G06V 10/60; G06T 7/90; G06T 11/001; G06T 2207/10024; H04N 1/6061
(Continued)

(56) References Cited

U.S. PATENT DOCUMENTS

| | | | |
|---|---|---|---|
| 2007/0052735 A1* | 3/2007 | Chou ................... | G09G 3/2003 348/E17.005 |
| 2008/0007564 A1* | 1/2008 | Tokunaga ............. | G06T 11/206 345/594 |

(Continued)

FOREIGN PATENT DOCUMENTS

JP H11355798 A 12/1999

OTHER PUBLICATIONS

International Search Report and Written Opinion of the International Searching Authority issued in International Application No. PCT/US2021/040740, mailed Oct. 28, 2021, 10 pages.

*Primary Examiner* — Sheela C Chawan
(74) *Attorney, Agent, or Firm* — Miller Nash LLP

(57) ABSTRACT

A test and measurement device is described that has an input for receiving a selected image, a display output, and one or more processors configured to receive a maximum and minimum luminance value related to the selected image, and generate a chromaticity diagram of the image on the display output for only those pixels in the selected image that have luminance values between the maximum and minimum luminance values. The device may also generate a modified image from the selected image in which pixels from the selected image that fall within the maximum and minimum luminance value are reproduced in the modified image without modification and other pixels not within the maximum and minimum luminance value are modified. Methods are also described.

15 Claims, 14 Drawing Sheets

(51) Int. Cl.
 *G06V 10/56* (2022.01)
 *G06V 10/60* (2022.01)
(58) Field of Classification Search
 USPC .................................................. 382/169, 100
 See application file for complete search history.

(56) References Cited

U.S. PATENT DOCUMENTS

2018/0336397 A1* 11/2018 Smith .................... G06V 40/16
2019/0102872 A1* 4/2019 Moussa ..................... G06T 7/30

* cited by examiner

SYSTEM FOR LUMINANCE QUALIFIED CHROMATICITY

CROSS-REFERENCE TO RELATED APPLICATIONS

This application claims priority to and benefit of Indian provisional patent application No. 202011029187, filed Jul. 9, 2020, titled SYSTEM FOR LUMINANCE QUALIFIED CHROMATICITY, the disclosure of which is incorporated herein by reference in its entirety. This application also claims priority to and benefit of Indian provisional patent application No. 202011029535, filed Jul. 11, 2020, titled VIDEO MONITORING USING REGION OF INTEREST QUALIFIED MEASUREMENTS, the disclosure of which is incorporated herein by reference in its entirety.

FIELD

This disclosure relates to measuring and reporting chromaticity, and, more particularly, to a system for generating and reporting chromaticity measurements in images and video.

BACKGROUND

Colored light, as it is used in the video and other industries, is a combination of two aspects, luminance and chromaticity. Luminance is the brightness of the light making up the color, and chromaticity is the specification of the color component itself, typically defined through coordinate values of a color space or a mathematically transformed color space. The well-known CIE 1931 color space chromaticity diagram provides a relatively easy way to visualize color in two dimensions. Although the diagram is typically illustrated in color, FIG. 1A illustrates the CIE 1931 color space chromaticity diagram in black and white, which is suitable for purposes of the explanation of this disclosure. The two dimensions in this chromaticity diagram correspond to the x and y chromaticity values from the xyY color space, where x and y represent a color value and Y represents a luminance value. It is well known that the xyY color space is derived from the XYZ color space by normalizing the X, Y, and Z components against their sum. The CIE 1931 color space chromaticity diagram was created by projecting the xy values from the xyY three-dimensional color space into a two-dimensional plane along the Y axis. In other words, (x,y) points with different Y (luminance) values map to the exact same point in the CIE 1931 (x,y) 2D chromaticity diagram of FIG. 1A.

While the CIE chromaticity diagram of FIG. 1A describes the colors seen by the eyes of a standard observer, image-producing devices such as televisions, computer monitors, tablets, phones, and other types of displays generally do not display such a large color gamut. FIG. 1B illustrates the triangular bounds of a commonly used defined color gamut, ITU BT. 709, superimposed on the entire chromaticity diagram of FIG. 1A. Examination of FIG. 1B easily illustrates that the color gamut of ITU BT. 709 is smaller, i.e., produces fewer individual colors than the entire human visible gamut displayed in FIG. 1A. A defined color gamut, like the one illustrated in FIG. 1B, shows the outer edges of colors that are produced in that gamut. A television or other display device may be qualified, or graded, on its ability to properly display an entire defined color gamut.

A good use case for the CIE diagram with a defined gamma, such as FIG. 1B, is in color grading during cinema/television post-production. For example, a colorist might look at the distribution of colors for a scene in a CIE chart to determine if all the colors are within the expected gamut (e.g. ITU BT.709) or whether the colors are at the expected chromaticity locations.

A limiting issue with using the CIE diagram of FIG. 1A or the gamut chart of FIG. 1B for evaluating color distribution is that, based on the definition of the chart, luminance levels of the individual pixels are not considered. In other words, as described above, pixels with the same (x,y) chromaticity values, but different luminance levels, will map to the exact same location in the chart. Thus, there is no way to represent the luminance levels of the pixels contributing to a color area in the chromaticity chart, and therefore a colorist has no way of considering luminance when evaluating an image or scene.

Embodiments of the invention address these and other issues in the art.

DETAILED DESCRIPTION

Embodiments of the invention are directed to a system for a visual representation of a subset of chromaticity values used to make up an image. Specifically, the defining bounds of the subset is based on luminance values. More specifically, embodiments of the invention produce a set of chromaticity values of image pixels for only those pixels that have a luminance value within a desired range. In other words, such embodiments are able to qualify, or limit, a diagram to show images and chromaticity traces for only a luminance zone of interest to the user. The user can control the zone of luminance, which may be as broad or as narrow as desired. Thus, embodiments of the invention produce a luminance-qualified chromaticity visual representation of an image, in multiple forms.

Figure 1A:
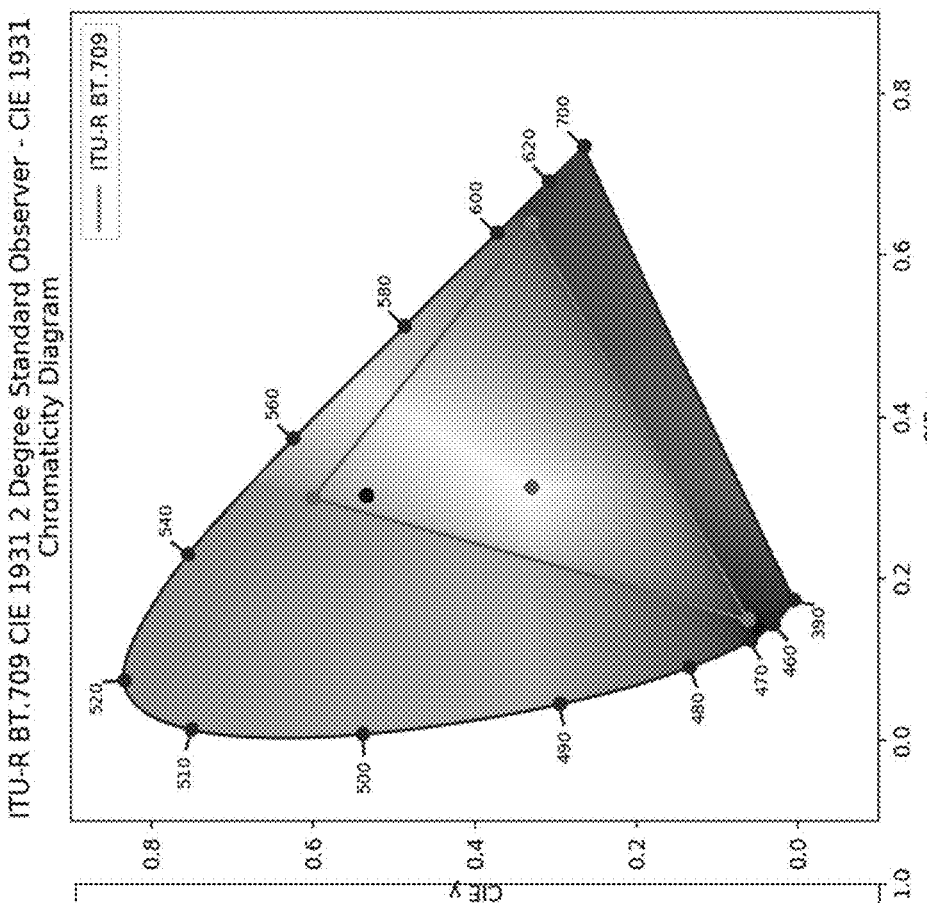
FIG. 1A is the published CIE 1931 Chromaticity Diagram for a standard observer.
Figure 1B:
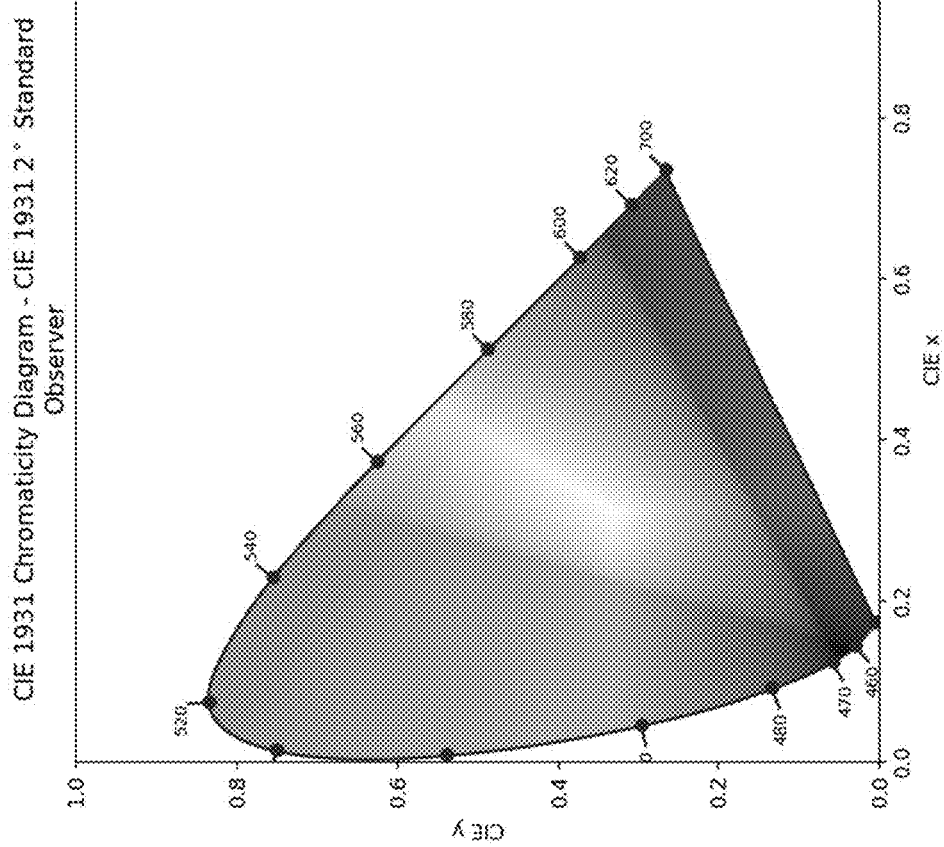
FIG. 1B shows the defined color gamut of ITU BT.709 superimposed on the Chromaticity Diagram of FIG. 1A.
Figure 2A:
FIG. 2A is a base image of a forest that is used to show operation of embodiments of the invention.
Figure 2B:
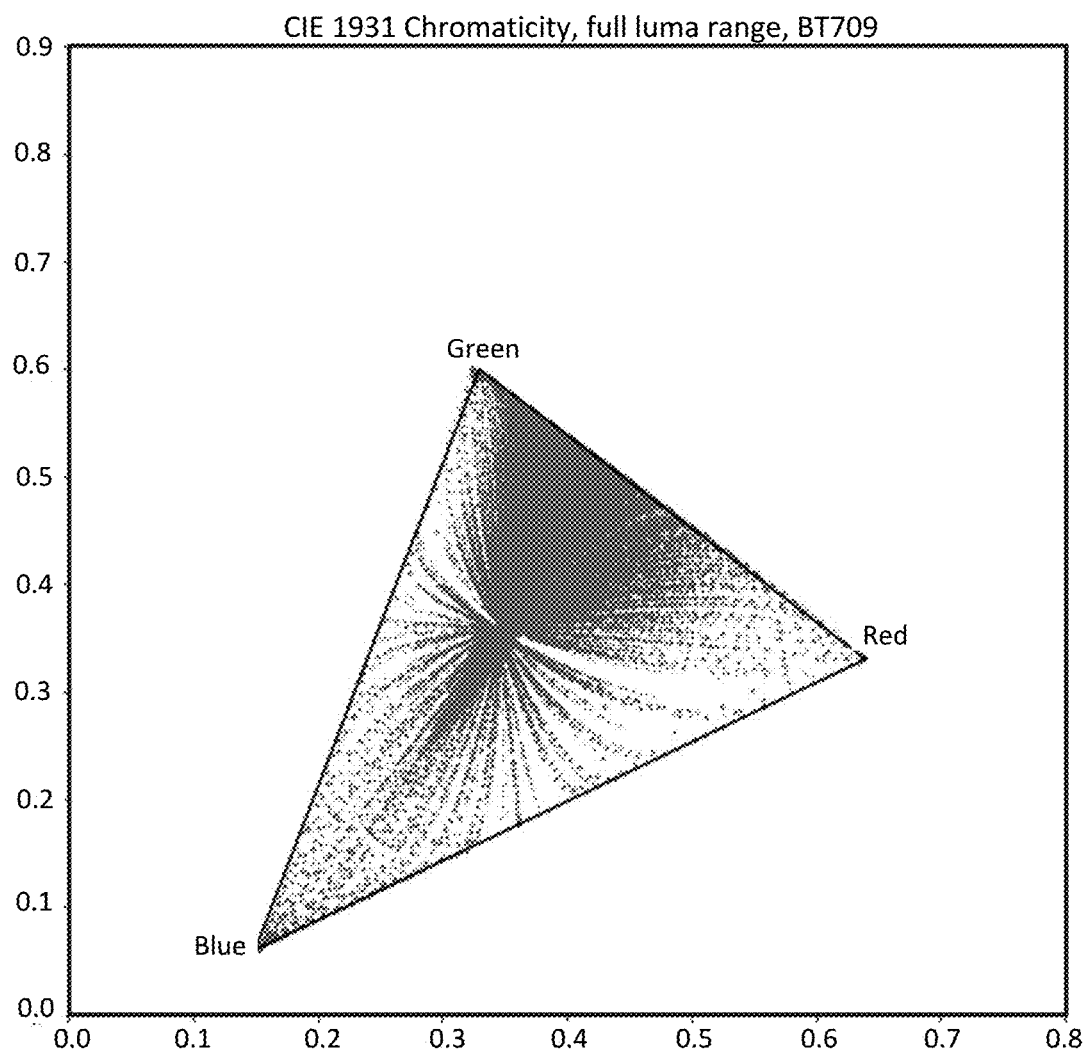
FIG. 2B is a monochromatic CIE chromaticity gamut diagram produced from the image of FIG. 2 illustrating locations of all of the colors of all the pixels that make up the image illustrated in FIG. 2A.

FIG. 2A is a black and white base image of a forest that is used to show operation of embodiments of the invention. Although FIG. 2A is in black and white, the original image from which FIG. 2A was produced is a color image. FIG. 2B is a CIE chromaticity diagram limited to a particular gamut (in this case ITU BT.709) in monochrome, which is the same gamut illustrated in FIG. 1B. In this disclosure the CIE chromaticity diagram may also be referred to as a chart or display. The difference between FIGS. 1B and 2B is that, in FIG. 2B, only the chromaticity values of the pixels that make up the color version of FIG. 2A are plotted in the CIE diagram, whereas, in FIG. 1A, all possible chromaticity values are plotted. To generate FIG. 2B, each pixel in the color version of FIG. 2A was inspected and its corresponding (x,y) color value mapped onto the selected gamut. Variations on producing CIE diagrams such as FIG. 2B are described in detail below.

Figure 3A:
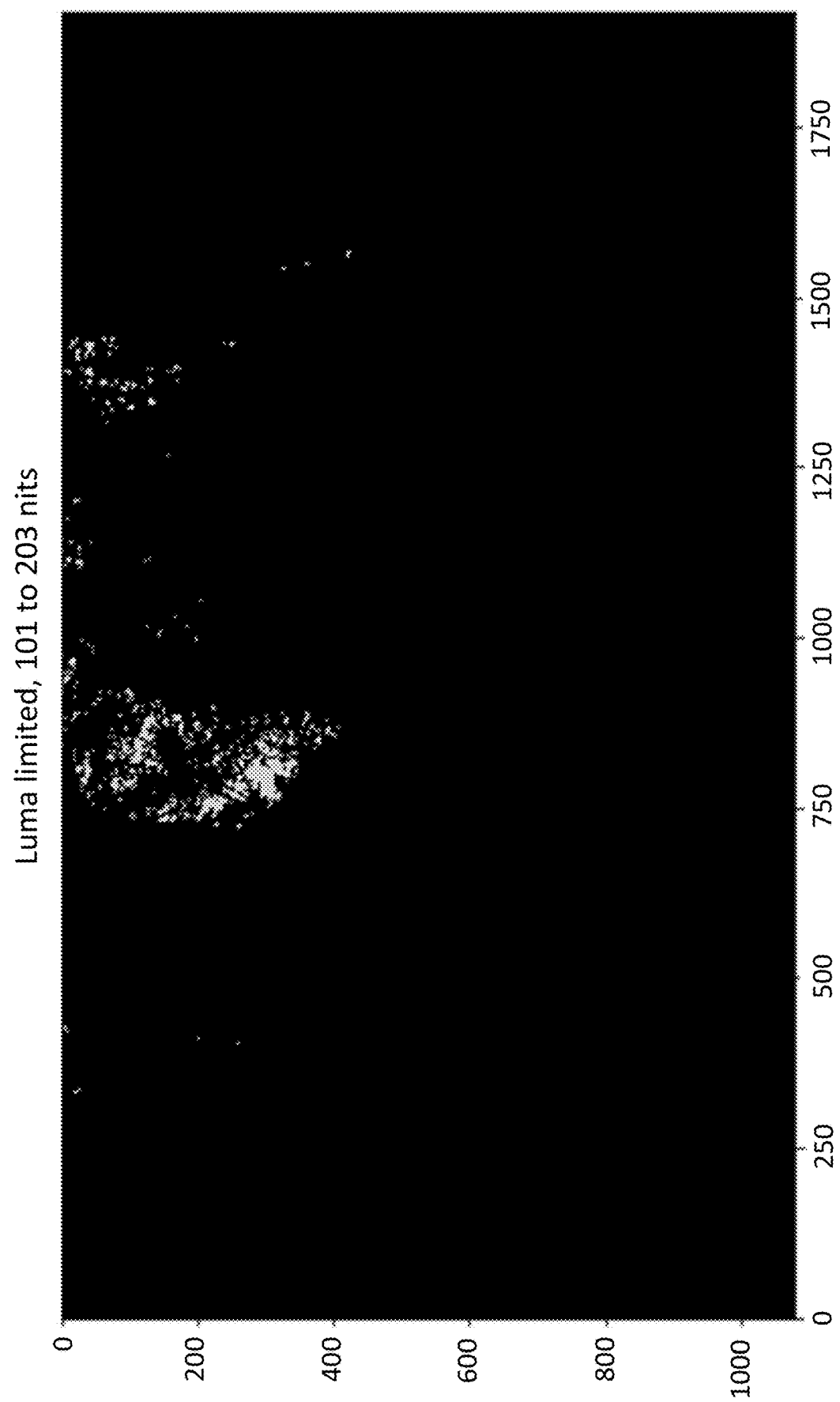
FIG. 3A is a luminance gated image constructed by passing only those pixels from the image of FIG. 2A that have a luminance value between a minimum and maximum defined value, according to embodiments of the invention.

FIG. 3A is a luminance-gated image of the image of FIG. 2A, according to embodiments of the invention. In FIG. 3A, only those pixels of FIG. 2A that have a luminance value between a maximum and minimum luminance value are used to make up FIG. 3A. In particular, FIG. 3A is a copy of the image of FIG. 2A that is limited to a luminance zone between 101 and 203 nits.

To produce FIG. 3A, the luminance value for each individual pixel of FIG. 2A is individually compared to the selected range of luminance values. Reference will be made to a flowchart of FIG. 6 in addition to the images of FIGS. 2A and 3A to explain the process. A flow 600 of FIG. 6 begins at an operation 602, where the base image or video frame is selected. In this example the base image is the image of FIG. 2A. Next, a pixel from the base image is compared to the selected range of luminance values. In this example, the selected range of luminance values is between 101 and 203 nits. If the pixel from FIG. 2A being inspected has a luminance value between these values, i.e., within the selected range, then the pixel is passed without modification in its same pixel position to create the image of FIG. 3A. Pixels within the desired luminance range process through operations 604, 606, and 610 of FIG. 6. Pixels of FIG. 2A that have a luminance value outside of the selected range are set to black. These pixels have the extra step of operation 608, which sets the color value of the inspected pixel to black prior to inserting the black pixel into the pixel location in FIG. 3A. Thus the image of FIG. 3A is created by passing only those pixels of FIG. 2A that have a luminance value within the selected range to their same location in FIG. 3A, otherwise the pixels outside the range in the resulting image of FIG. 3A show as black pixels. The pixels outside the set luminance range need not necessarily be set to black in operation 608, and embodiments of the invention may instead set the out-of-range pixels to any desired color. Or operation 608 may apply a different effect to out-of-luminance-range pixels, to set them apart from the pixels within the desired luminance zone, such as providing those pixels with a low luminance value or other distinguishing visual property.

Figure 3B:
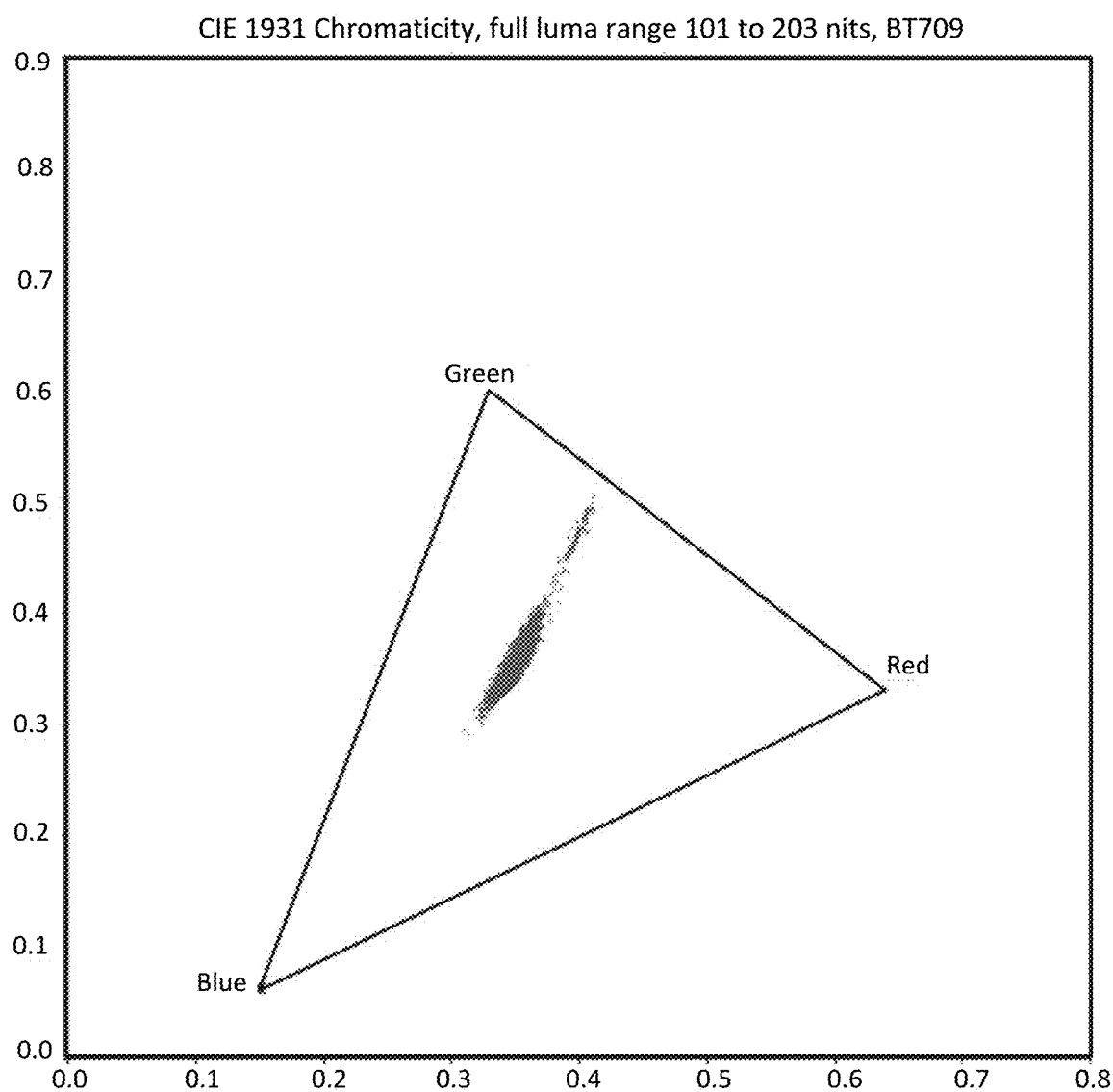
FIG. 3B is a CIE chromaticity gamut diagram produced from the image of FIG. 3A illustrating locations of all of the colors of only those luminance-qualified or luminance-gated pixels making up the image illustrated in FIG. 3A.

Creating a luminance-qualified or luminance gated image, such as that of FIG. 3A, is one of the resulting outputs for particular embodiments of the invention. Other embodiments are directed to also creating a graph or display from the CIE chromaticity diagram that provides additional information about the image being analyzed. FIG. 3B illustrates a CIE diagram that provides particular information about the image of FIG. 3A. Details of the process to create FIG. 3B are provided below with reference to FIG. 7. In general, however, FIG. 3B is created by mapping the chromaticity values onto the CIE (x,y) diagram for only the pixels in FIG. 3A within the desired luminance range, and only for those values within a selected gamut. In the case of FIG. 3B, the desired luminance range was 101 to 203 nits, the same as that used to produce FIG. 3A from FIG. 2A, and the desired gamut is ITU BT.709. Although FIG. 3B is a monochrome diagram, embodiments of the invention may also produce it in color, where each pixel plotted in FIG. 3B would be its corresponding actual color from the CIE 1931 diagram of FIG. 1A.

Figure 4A:
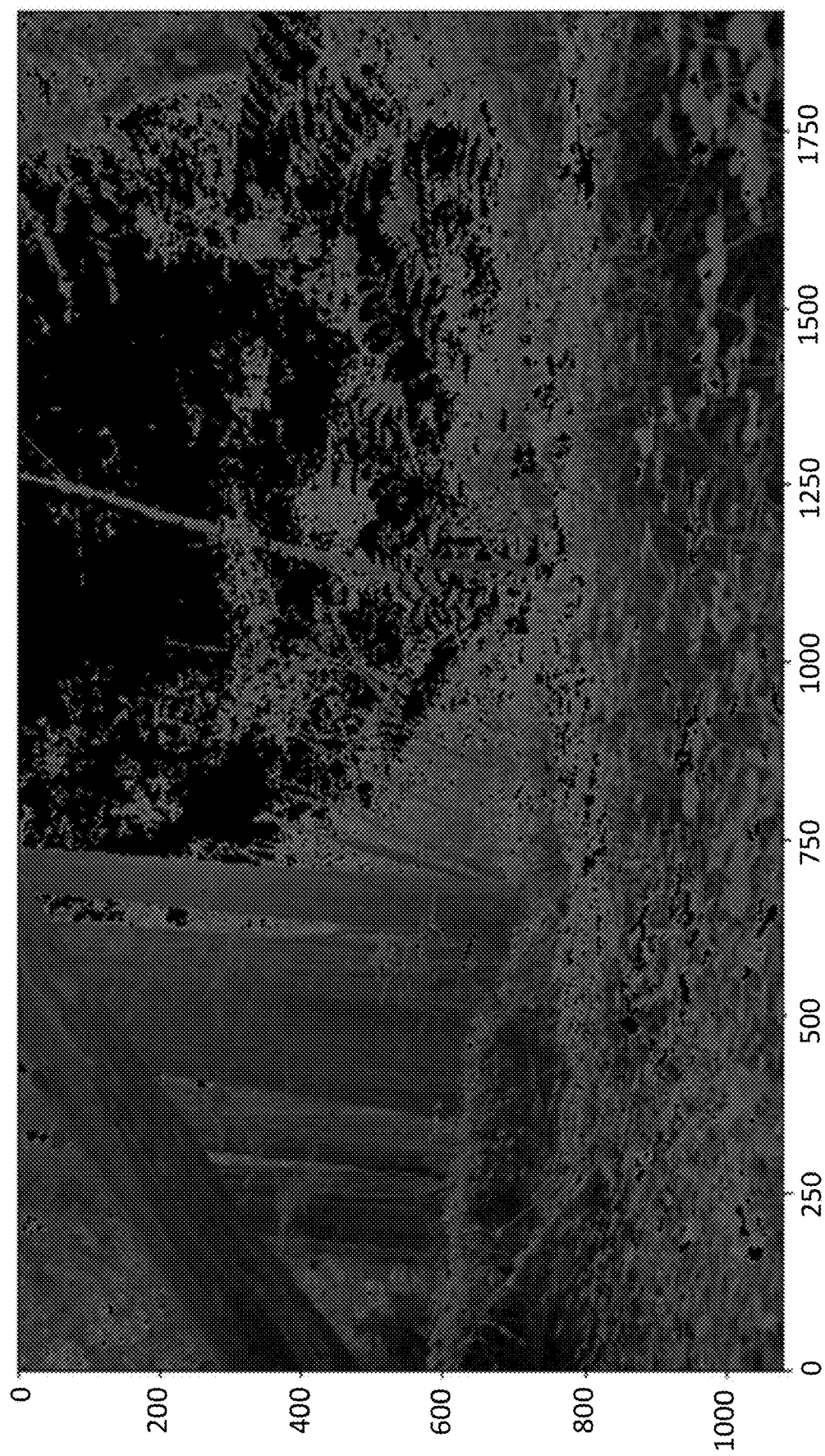
FIG. 4A is a luminance gated image constructed by passing only those pixels from the image of FIG. 2A that have a luminance value between a minimum and maximum defined value, according to embodiments of the invention.
Figure 5A:
FIG. 5A is a luminance gated image constructed by passing only those pixels from the image of FIG. 2A that have a luminance value between a minimum and maximum defined value, according to embodiments of the invention.

Obviously, the process to create FIGS. 3A and 3B can be repeated using any desired luminance value. FIG. 4A was generated by passing each pixel from the color version of FIG. 2A through a luminance filter of 10-bit Serial Digital Interface (SDI) code values between 0 and 392. Pixels not within this range were set to black. FIG. 5A was generated by passing each pixel from the color version of FIG. 2A through a luminance filter having a luminance value that is between 38% and 68% of the maximum luminance value. In some embodiments the maximum luminance value is the maximum luminance value of the individual pixels making up the image itself, while in other embodiments the maximum luminance value is the maximum luminance value that is possible for any image.

The CIE charts 4B and 5B that correspond to the images of FIGS. 4A and 5A, respectively were made according to the same process for creating FIG. 3B. The luminance threshold applied to generate the CIE diagram of FIG. 4B was the luminance code values between 0 and 392, while the luminance threshold applied to generate the CIE diagram of FIG. 5B was the luminance values between 38% and 68% of the maximum luminance value. The gamut used to generate both FIGS. 4B and 5B was ITU BT.709.

Figure 4B:
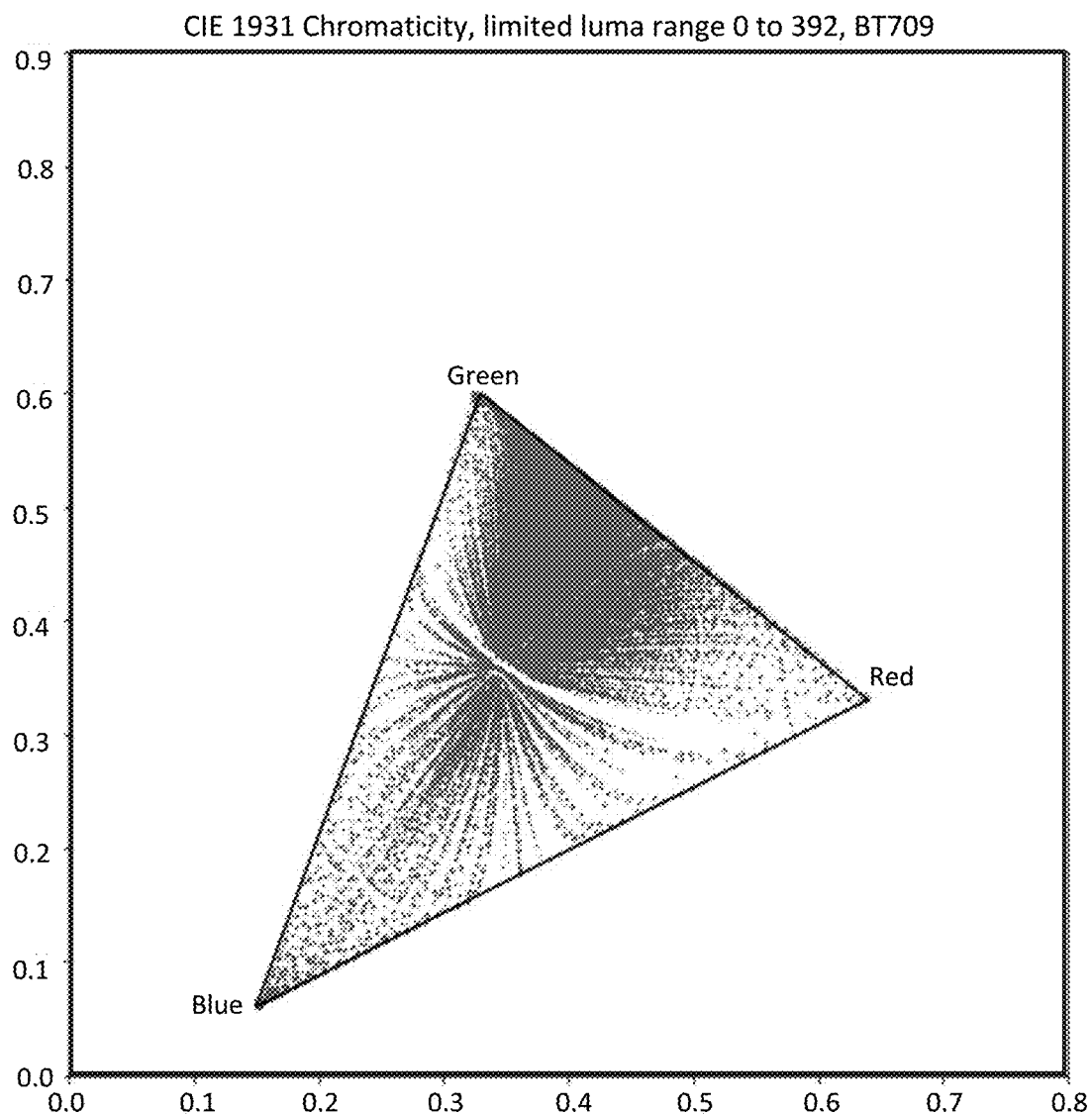
FIG. 4B is a CIE chromaticity gamut diagram produced from the image of FIG. 4A illustrating locations of all of the colors of only those luminance-qualified or luminance-gated pixels making up the image illustrated in FIG. 4A.
Figure 5B:
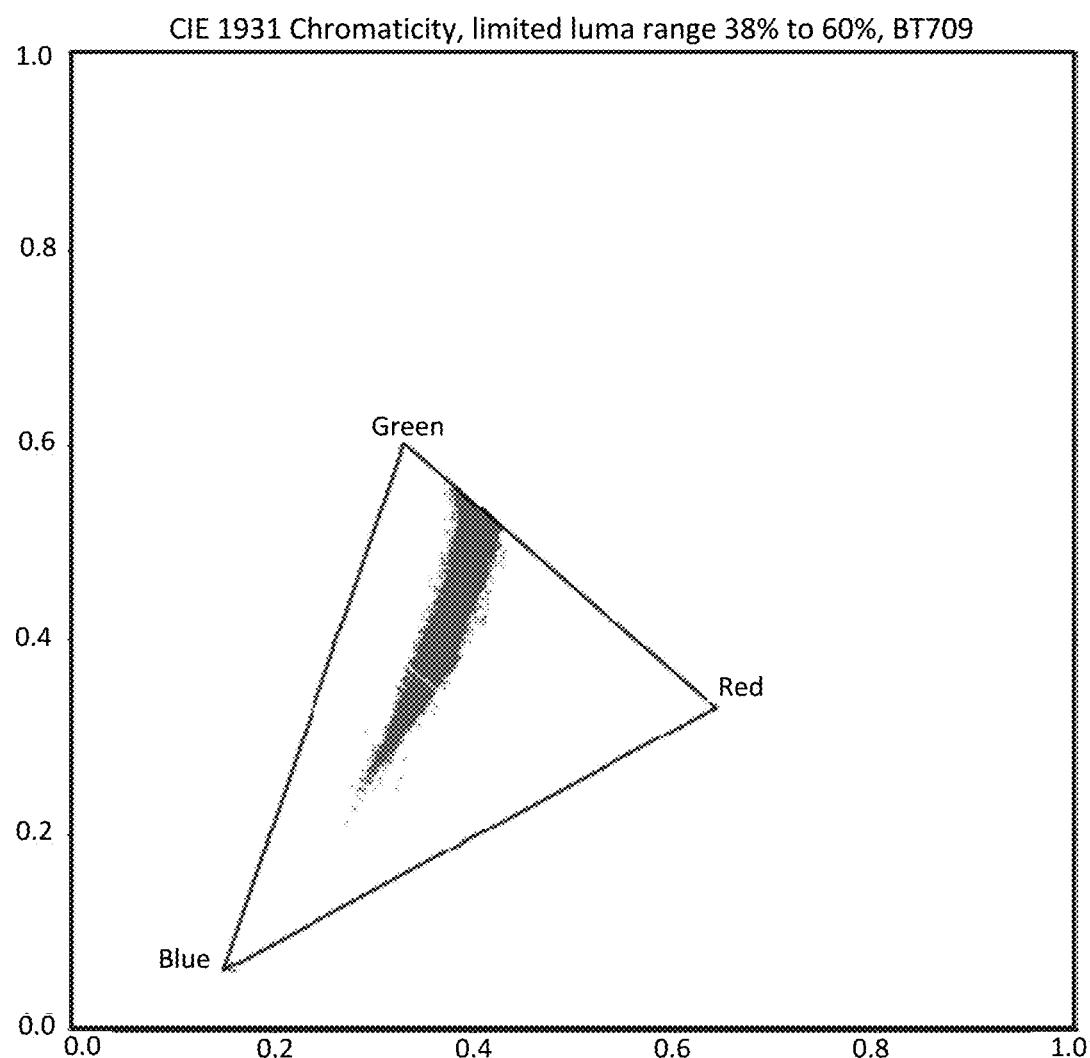
FIG. 5B is a CIE chromaticity gamut diagram produced from the image of FIG. 5A illustrating locations of all of the colors of only those luminance-qualified or luminance-gated pixels making up the image illustrated in FIG. 5A.
Figure 7:
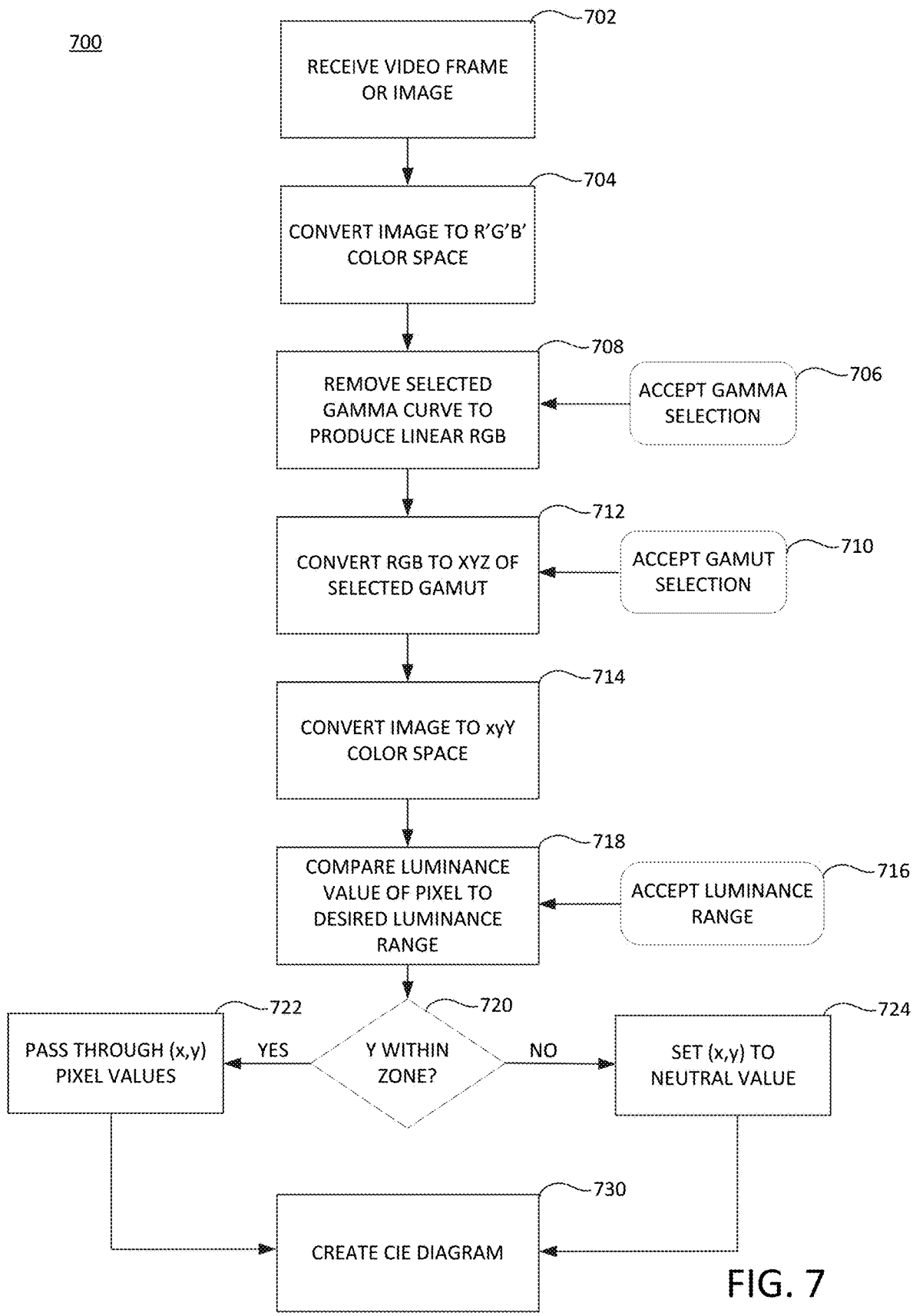
FIG. 7 is a flowchart that illustrates example operations to apply a luminance qualification and generate a modified CIE chromaticity gamut diagram, according to embodiments of the invention.

Additional details of generating CIE charts, such as FIGS. 3B, 4B, and 5B, are provided with reference to FIG. 7, according to embodiments of the invention. An example flow 700 begins with receiving a selected video frame or image in an operation 702 and converting the received image to R'G'B' color space in an operation 704. The apostrophes in R'G'B' refer to the fact that the signal components are gamma compressed, such as to Standard Dynamic Range (SDR) or High Dynamic Range (HDR).

In an operation 708, the gamma of the R'G'B' image is removed to create linear RGB signals. The particular gamma curve upon which the operation 708 operates is selected in an operation 706.

Next, a particular gamut for generating the CIE diagram is selected in an operation 710. Selecting a particular gamut will change the size and position of the gamut triangle relative to the CIE 1931 gamut diagram. In other words, selecting the desired gamut determines where the gamut triangle will be placed, such as in position of the gamut triangle illustrated in FIG. 1B relative to the entire gamut diagram of FIG. 1A.

All of the examples illustrated above were based on the ITU BT.709, gamut, but any other defined gamut may also be selected, such as DCI-P3, ITU-BT.2020 etc. After the gamut is accepted in the operation 710, an operation 712 converts the RGB signals produced in operation 708 to XYZ color space in an operation 712.

Next, the image is converted from XYZ to xyY color space in an operation 714. Recall from above that this operation 714 maps three-dimensional color into a two-dimension color mapping.

An operation 718 applies the luminance range limits to the process, as described above. The luminance range is provided in an operation 716. The units for the luminance limits may be specified in terms of nits (candelas/m$^2$), Institute of Radio Engineers units (IRE) (0-100%), digital code values, normalized linear luminance scales etc. In operation 718, the luminance value for each pixel of the image generated in operation 714 is checked against the provided limits in an operation 720. If the luminance value for the selected pixel lies outside the limits, the (x,y) chromaticity values are forced to a neutral value, such as 0, the D65 white point, or any other selected value in an operation 724. Neutral, with respect to this operation, means that the pixel having a luminance value outside the set limits will effectively be ignored, and will not appear in, or otherwise not be visible in, the final CIE diagram. Otherwise, if the luminance value lies within the limits, the (x,y) chromaticity values are passed through to the CIE diagram, in an operation 722. Luminance values having exactly one of the specified minimum or maximum values may be modified or passed depending on the specifics of the implementation. Finally, the CIE chart, such as those described above with reference to FIGS. 3B, 4B, and 5B is generated in an operation 730 from the values given to the pixels by either operations 722 or 724.

The operations described above with reference to FIGS. 6 and 7 may operate on a specific test and measurement hardware, such as a waveform monitor. Or the operations may be performed by a programmed general purpose processor system, digital signal processor, Application Specific Integrated Circuit (ASIC), etc.

Figure 8:
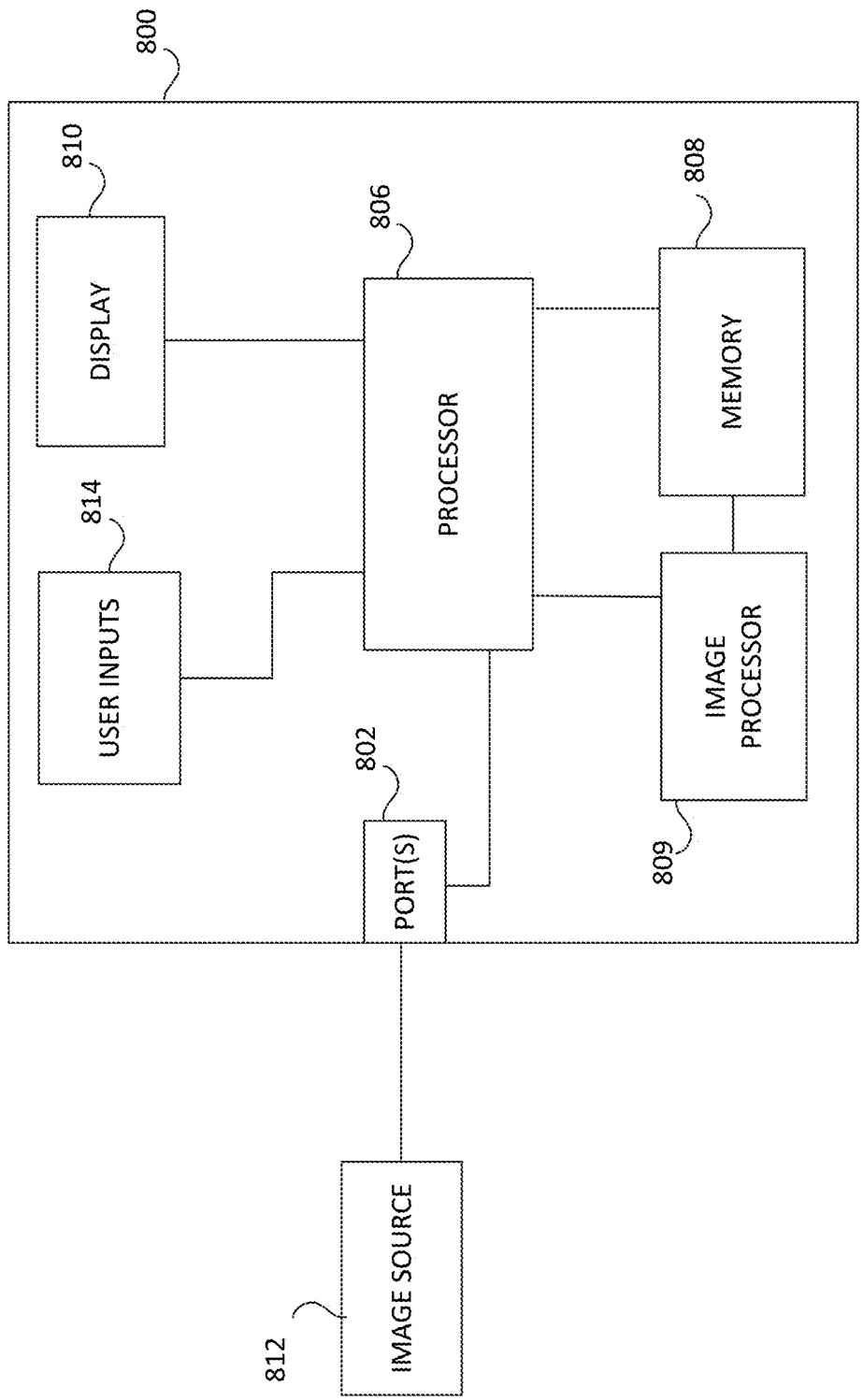
FIG. 8 is a block diagram of an example test and measurement instrument, such as a waveform monitor, for implementing examples disclosed herein.

FIG. 8 is a block diagram of an example test and measurement instrument 800, such as a waveform monitor, for implementing examples disclosed herein. The test and measurement instrument 800 includes one or more ports 802, which may be any electrical signaling medium. Ports 802 may include receivers, transmitters, and/or transceivers. Although only one processor 806 is shown in FIG. 8 for ease of illustration, as will be understood by one skilled in the art, multiple processors 806 of varying types may be used in combination, rather than a single processor 806.

The instrument 800 may be coupled to an image source 812 through one or more ports 802, from which the instrument 800 receives images for analysis. The images may be transferred from the image source 812 to the port 802 through a wired or wireless connection. The connection may be a Local Area Network (LAN) connection, USB, or other conventional method of transferring data. In addition the connection could also be one from a streaming image source 812. In some embodiments the image source 812 may connect to the port(s) 802 through the internet or other network.

The one or more processors 806 may be configured to execute instructions from memory 808 and may perform any methods and/or associated steps indicated by such instructions, such as generating the luminance-qualified images or the CIE charts described above. Computer instructions that make up the operations of flows 600 and 700 may operate on the one or more processors. Memory 808 may be implemented as processor cache, random access memory (RAM), read only memory (ROM), solid state memory, hard disk drive(s), or any other memory type. Memory 808 acts as a medium for storing data, computer program products, and other instructions. The test and measurement instrument 800 may include additional hardware and/or processors, such an image processor 809 to perform particular image processing, such as some or all of the operations described with reference to FIGS. 6 and 7. The image processor 809 may be include its own internal memory, or may access the system memory 808, or use a combination of these methods. The resulting images and charts can then be stored in a memory 808, as well as displayed on a display 810.

User inputs 814 are coupled to the one or more processors 806. User inputs 814 may include menu buttons, a keyboard, mouse, touchscreen, programmable interface, and/or any other controls employable by a user to interact with the instrument 800. The user inputs 814 may be used to select particular images for analysis, as well as for providing selected parameters to be used by the instrument 800, such as gamma, gamut, and the range of luminance values of interest. In some embodiments, the luminance range or qualification could be entered by a user in text form. In other embodiments the luminance range could be applied using position sliders on a histogram display that would define the minimum and maximum limits for the luminance zone. Other methods of receiving the luminance range from a user may depend on specific implementations of embodiments of the invention.

The display 810 may be a digital screen, a cathode ray tube based display, or any other monitor to display waveforms, measurements, and other data to a user. While the components of test and measurement instrument 800 are depicted as being integrated within test and measurement instrument 800, it will be appreciated by a person of ordinary skill in the art that any of these components can be external to test instrument 800 and can be coupled to test instrument 800 in any conventional manner (e.g., wired and/or wireless communication media and/or mechanisms). For example, in some configurations, the display 810 may be remote from the test and measurement instrument 800. Similarly, the image source 812 may be distant from the test instrument.

Figure 6:
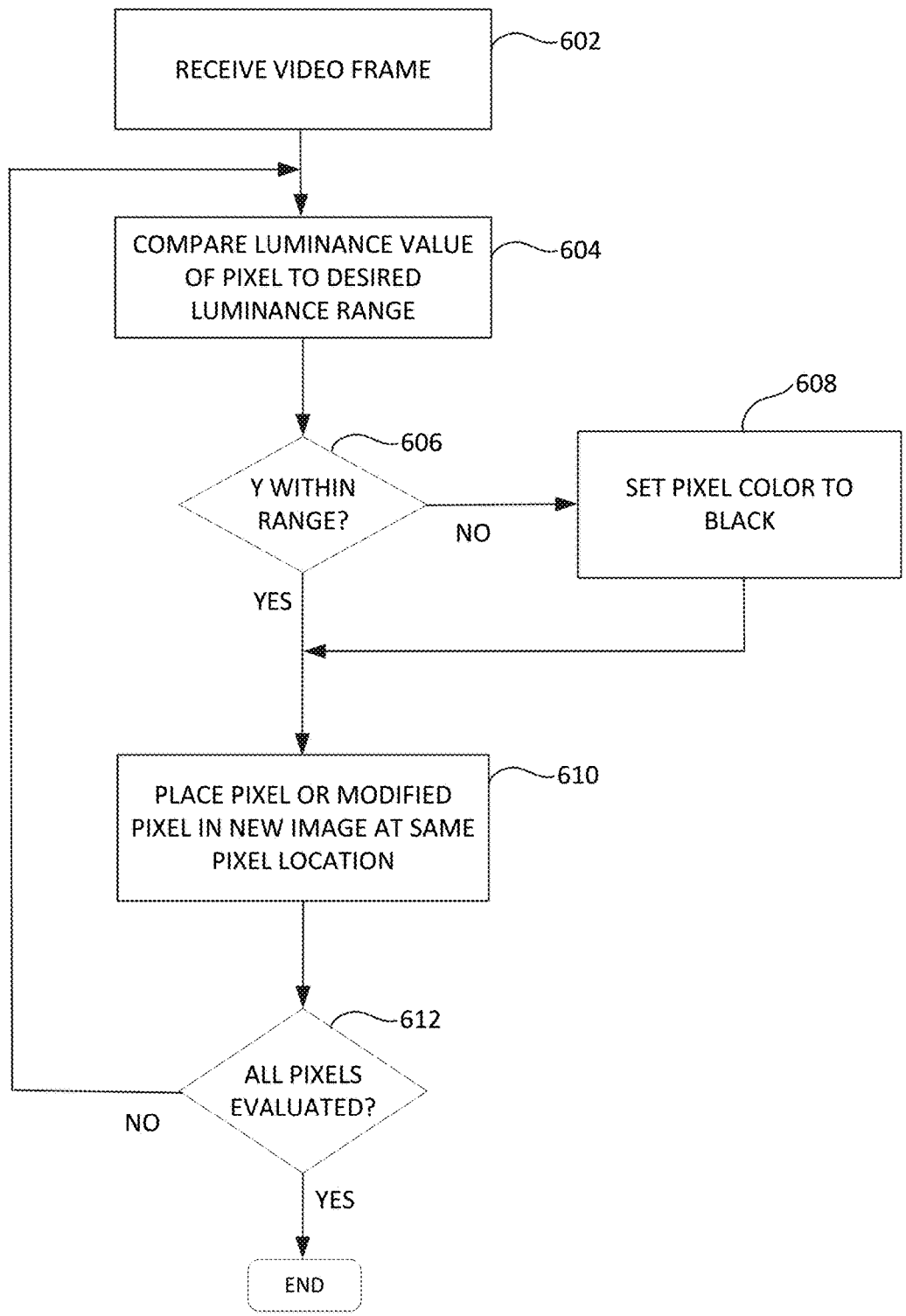
FIG. 6 is a flowchart that illustrates example operations to generate a luminance gated image according to embodiments of the invention.

With reference to FIGS. 6 and 7, the image resulting from the flow 600 is the luminance-qualified or luminance-gated image, such as those illustrated in FIGS. 3A, 4A, and 5A. Similarly, the chart resulting from the flow 700 is the custom luminance-qualified or luminance-gated CIE diagram based on user inputs and controls, such as those illustrated in FIGS.

3B, 4B, and 5B. Although the illustrations of this disclosure must be in black and white, embodiments of the invention produce color images as well.

One application of the above process could be embodied in a waveform monitor that produces the qualified image diagram (FIGS. 3A, 4A, and 5A, e.g.) on one portion of the display 810, and produces the custom CIE diagram (FIGS. 3B, 4B, and 5B, e.g.) on another portion of the display 810. In some embodiments, the luminance qualification provided by the user would apply to both the picture display and the CIE diagram. In some embodiments the display 810 may also show the original selected image, as well as the particular user selections used to make the qualified image and diagrams. For instance, the particular gamut may be shown on the display 810, and the user could change the gamut to ensure the image conformed to multiple gamuts. Similarly, the user may modify the luminance value of the desired range, and the instrument 800 could update the qualified image display and the CIE diagram in real-time.

Embodiments of the invention may be extended to a system that provides all of the functionality, analysis, and image/chart generation as described above, but that also allows a user to select a only portion of the full frame of images or video images for analysis. In this disclosure the selected portions are referred to as Regions of Interest, or ROIs.

Figure 9A:
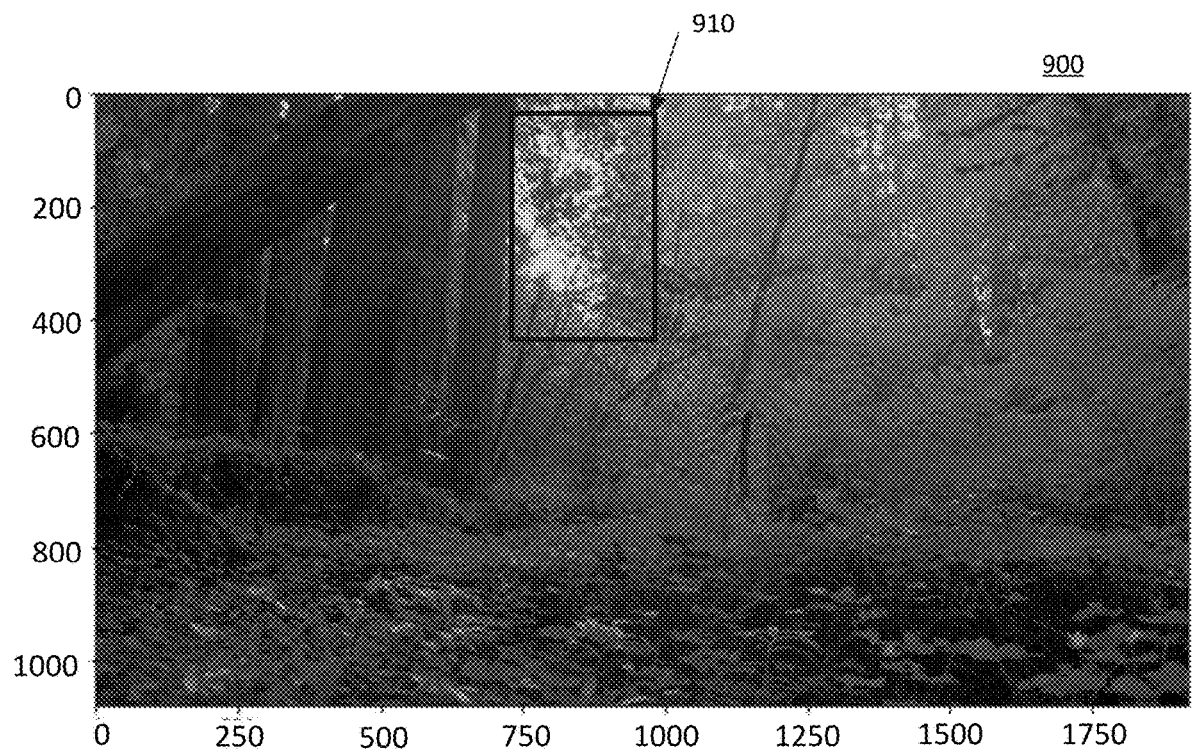
FIG. 9A is an image illustrating selecting a region of interest within an image, according to embodiments of the invention.
Figure 9B:
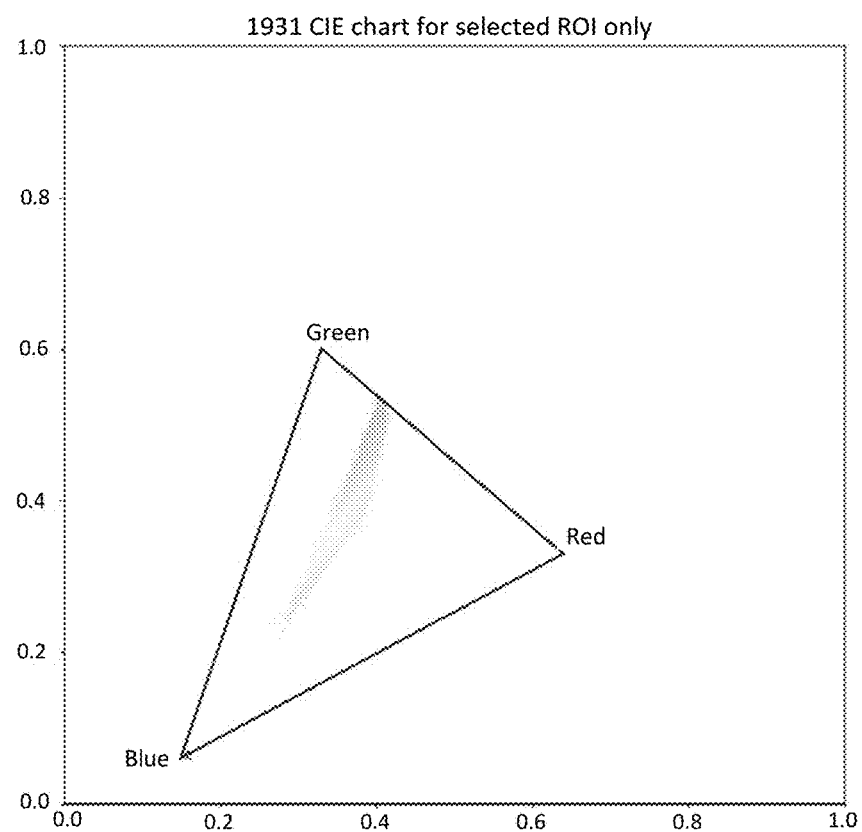
FIG. 9B is a CIE chromaticity gamut diagram produced from pixels only within the region of interest illustrated in FIG. 9A, according to embodiments of the invention.
Figure 10A:
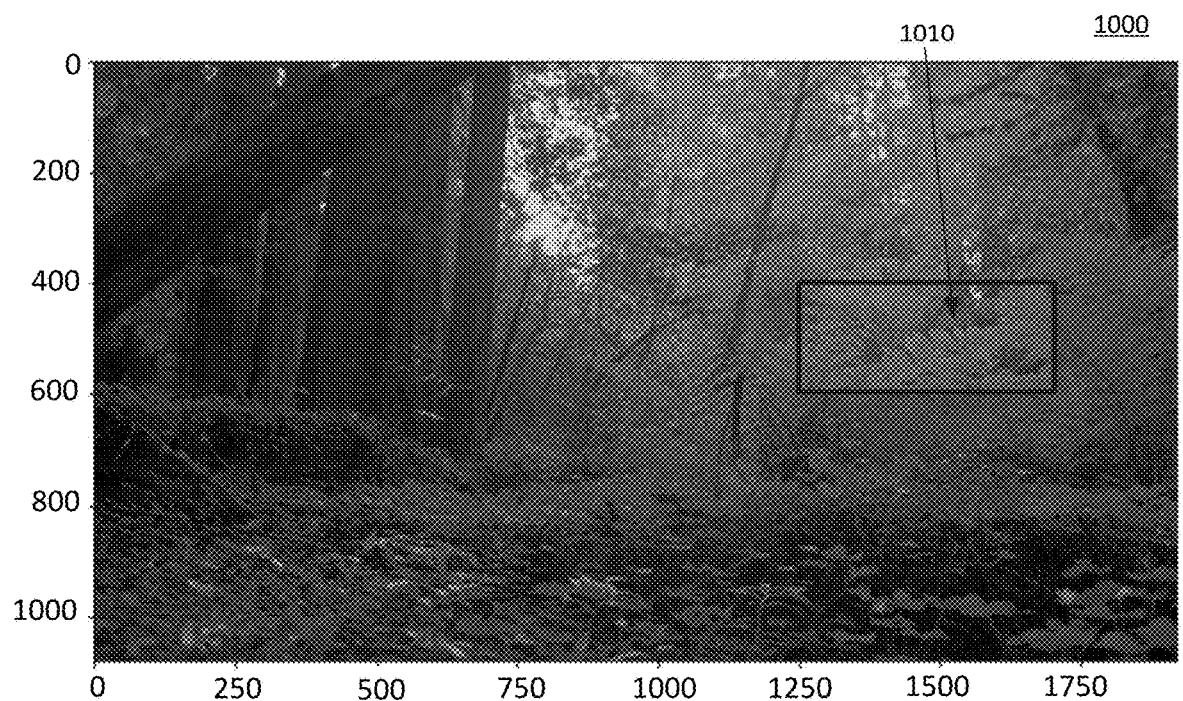
FIG. 10A is an image illustrating selecting another region of interest within an image, according to embodiments of the invention.
Figure 10B:
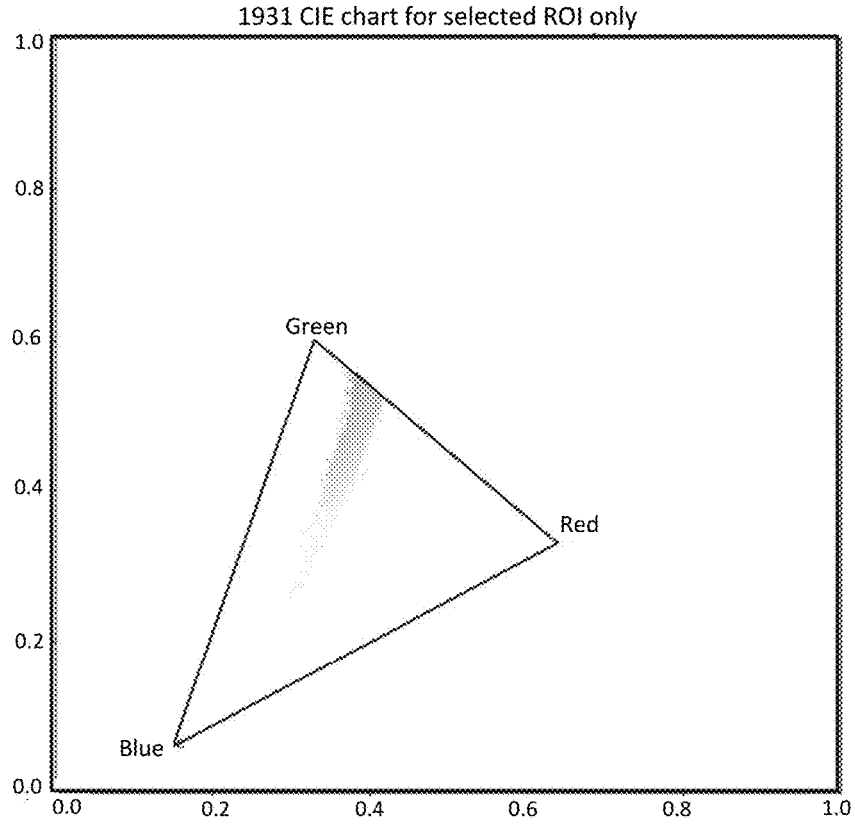
FIG. 10B is a CIE chromaticity gamut diagram produced from pixels only within the region of interest illustrated in FIG. 10A, according to embodiments of the invention.

This extended system allows the user to specify a ROI by selecting a region in an image or frame, and the system performs its analysis and generates images and a CIE diagram for only that selected ROI region. A user can select an ROI of any size, any shape, and in any position of the original image. For example, with reference to FIG. 9A, a user could select an ROI 910 of an image 900. Then, a CIE diagram could be generated for only the selected ROI. For example, the CIE diagram of FIG. 9B maps the chromaticity values for the selected ITU BT.709 gamut only for those pixels in the image 900 that a) have a luminance value within the selected range; and b) only for those pixels located within the ROI 910 of the image 900. FIGS. 10A and 10B illustrate another example, where an ROI 1010 from a selected image 1000 is used to define the parameters, and specifically the location boundaries of the pixels used to generate the CIE diagram, as described above.

With reference to FIG. 7, there are various ways the flow 700 could be modified to include an ROI qualification. It is possible that only the pixels that make up the ROI could be selected and received in the operation 702. Or, if the entire image were still selected in operation 702, a separate comparison could be added before or after comparison 720 to determine whether the pixel being evaluated is within the ROI. If so, then the processing of the flow 700 would continue as normal. If the pixel being evaluated was outside the ROI, that pixel could be ignored, or could also be set to the same color as pixels not falling within the luminance range, in operation 724. Other modifications could be made to the flow 700 to implement an ROI feature, and embodiments of the invention are not limited to those examples given above.

In some embodiments the ROI may be auto detected. In some embodiments, the ROI may be highlighted with a red or other solid color border. In some embodiments, the display 810 of the instrument 800 may decrease the brightness, contrast, or saturation (or combination thereof) in areas of the original image not within the ROI, so that only the selected ROI in the picture display is shown with the original colors to emphasize the selected ROI.

In this operation mode, the ROI enhanced picture display and the CIE diagram may be "tied" together to create a ROI driven measurement/trace display mode. Meaning, if the user changes the ROI, then the CIE diagram will also change to measure only those colors that are within the ROI, and not within the entire base image. In some embodiments the CIE diagram will change in real-time as the ROI is changed.

The aspects of the present disclosure are susceptible to various modifications and alternative forms. Specific aspects have been shown by way of example in the drawings and are described in detail herein. However, one should note that the examples disclosed herein are presented for the purposes of clarity of discussion and are not intended to limit the scope of the general concepts disclosed to the specific aspects described herein unless expressly limited. As such, the present disclosure is intended to cover all modifications, equivalents, and alternatives of the described aspects in light of the attached drawings and claims.

References in the specification to aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

Additionally, this written description refers to particular features. One should understand that the disclosure in this specification includes all possible combinations of those particular features. For example, where a particular feature is disclosed in the context of a particular aspect, that feature can also be used, to the extent possible, in the context of other aspects.

In addition, when this application refers to a method having two or more defined steps or operations, the defined steps or operations can be carried out in any order or simultaneously, unless the context excludes those possibilities.

Although specific embodiments have been illustrated and described for purposes of illustration, it will be understood that various modifications may be made without departing from the spirit and scope of the disclosure.

We claim:

1. A method for generating a visual representation of a subset of all chromaticity values within an image, the method comprising:
   receiving, on one or more processors, a maximum and minimum luminance value;
   inspecting a luminance value of each pixel of the image;
   including in a chromaticity diagram attributes of each pixel of the image for which the inspected luminance value is within the maximum and minimum luminance value;
   not including in the chromaticity diagram attributes of each pixel of the selected image for which the inspected luminance value is outside the maximum and minimum luminance value;
   generating, on the one or more processors, the chromaticity diagram of the image;
   displaying, on a display, the chromaticity diagram generated by the one or more processors; and
   generating a modified image from the selected image.

2. The method of claim 1, in which receiving a maximum and minimum luminance value comprises receiving a maximum and minimum luminance value from a user.

3. The method of claim 1, in which the maximum and minimum luminance values are specified in nits, percentages of a maximum luminance value, IRE code values, or a normalized linear luminance scale.

4. The method of claim 1, in which not including in the chromaticity diagram attributes of each pixel of the selected image for which the inspected luminance value is outside the maximum and minimum luminance value comprises setting a representation of the pixel to a neutral value.

5. The method of claim 4, in which setting a representation of the pixel in the chromaticity diagram to a neutral value comprises setting a representation of the pixel to white.

6. The method of claim 1, further comprising:
receiving an updated maximum or updated minimum luminance value; and
updating the chromaticity diagram based on the updated luminance value.

7. The method of claim 1, in which generating a chromaticity diagram comprises generating a chromaticity diagram for a selected gamut.

8. A test and measurement device, comprising:
an input for receiving a selected image including a plurality of pixels;
a display; and
one or more processors configured to:
receive a maximum and minimum luminance value related to the selected image, and
inspect a luminance value of each pixel of the selected image;
include in a chromaticity diagram attributes of each pixel of the selected image for which the inspected luminance value is within the maximum and minimum luminance value;
not include in the chromaticity diagram attributes of each pixel of the selected image for which the inspected luminance value is outside the maximum and minimum luminance value;
generate the chromaticity diagram of the selected image on the display; and
generate a modified image from the selected image.

9. The test and measurement device of claim 8, in which the maximum and minimum luminance value are specified by a user.

10. The test and measurement device of claim 8, in which the maximum and minimum luminance values are specified in nits, percentages of a maximum luminance value, IRE code values, or a normalized linear luminance scale.

11. The test and measurement device of claim 8, in which the one or more processors are further configured to set a representation of each pixel in the chromaticity diagram for which the inspected luminance value is outside the maximum and minimum luminance value to a neutral value.

12. The test and measurement device of claim 8, in which the one or more processors are further configured to:
receive an updated maximum or updated minimum luminance value; and
update the chromaticity diagram on the display based on the updated luminance value.

13. The test and measurement device of 8, in which the chromaticity diagram is a chromaticity diagram for a selected gamut.

14. A test and measurement device, comprising:
an input for receiving a selected image;
a display; and
one or more processors configured to:
receive a maximum and minimum luminance value related to the selected image,
generate a chromaticity diagram of the image on the display for only those pixels in the selected image that have luminance values between the maximum and minimum luminance values, and
generate a modified image from the selected image in which pixels from the selected image that fall within the maximum and minimum luminance value are reproduced in the modified image without modification.

15. The test and measurement device of 14, in which pixels from the selected image that fall outside the maximum and minimum luminance value are reproduced in the modified image with modification.

* * * * *